United States Patent [19]
Richardson

[11] Patent Number: 5,913,230
[45] Date of Patent: Jun. 15, 1999

[54] OBJECT AND METHOD FOR PROVIDING EFFICIENT MULTI-USER ACCESS TO SHARED OPERATING SYSTEM KERNAL CODE USING INSTANCING

[76] Inventor: John J. Richardson, 2610 NE. 47th St., Lighthouse Point, Fla. 33432

[21] Appl. No.: 08/813,819

[22] Filed: Mar. 6, 1997

Related U.S. Application Data

[60] Provisional application No. 60/034,689, Jan. 7, 1997.

[51] Int. Cl.$^6$ ..................................................... G06F 12/00
[52] U.S. Cl. ........................................... 711/203; 711/173
[58] Field of Search .................................... 711/173, 203, 711/170, 202

[56] References Cited

U.S. PATENT DOCUMENTS

| | | | |
|---|---|---|---|
| 5,129,084 | 7/1992 | Kelly, Jr. et al. ........................ | 395/674 |
| 5,339,411 | 8/1994 | Heaton, Jr. .............................. | 395/600 |
| 5,729,710 | 3/1998 | Magee et al. ............................ | 711/203 |
| 5,752,031 | 5/1998 | Cutler et al. ............................ | 395/673 |

OTHER PUBLICATIONS

"Method of Control for Memory Segment Input/Output" from *IBM Technical Disclosure Bulletin*, vol. 40, No. 1, Jan. 1997, p. 155.

"Real–World Programming for OS/2 2.1" 1993, Sams Publishing, USA, pp. 475–505.

"Memory Protection Software Facility For OS/2 Shared Data Applications" from *IBM Technical Disclosure Bulletin*, vol. 34 No. 4A, Sep. 1991, pp. 81–89.

Jon Udell; "Byte"; *Citrix's New Multiuser OS/2 OS/2; – based workgroup computing without a LAN*; 16 (No. 1):4, 134–136, 138 (Jan. 1991).

*Primary Examiner*—Eddie P. Chan
*Assistant Examiner*—Christopher S. Chow
*Attorney, Agent, or Firm*—Testa, Hurwitz & Thibeault, LLP

[57] ABSTRACT

A method for improving the performance of a multi-user operating system includes the steps of providing a kernal mode memory region in which instantiations of kernal objects associated with each user may be stored. Each instantiation of a particular kernal object is accessed via the same virtual address. Storing instantiation of kernal objects reduces code contention for commonly used kernal objects while allowing the instantiation to retain kernal mode protection.

12 Claims, 5 Drawing Sheets

OBJECT AND METHOD FOR PROVIDING EFFICIENT MULTI-USER ACCESS TO SHARED OPERATING SYSTEM KERNAL CODE USING INSTANCING

CROSS REFERENCE TO RELATED APPLICATIONS

This application claims priority to co-pending Provisional Patent Application Ser. No. 60/034,689, filed on Jan. 7, 1997, the contents of which are incorporated herein.

FIELD OF THE INVENTION

The present invention relates to multi-user operating systems, in particular, to providing multi-user functionality in single-user operating systems as well as to improving the performance of multi-user operating systems having operating system code objects shared by multiple users.

BACKGROUND OF THE INVENTION

An operating system is software code that provides basic functions allowing a user or users to interact with a computer. For example, an operating system provides the user with commands for opening files, closing files, printing files, displaying data objects on a display screen, as well as many other functions.

In a computer system that is designed to service a single user only, a single copy of software code is required to provide these functions. As the user performs actions requiring operating system intervention, the appropriate section of the operating system code services the user request. In a system that services multiple users, however, it becomes unwieldy to provide a separate copy of the operating system code for each user.

This problem has been addressed in some multi-user operating systems by providing only a single copy of certain segments of the operating system code which are shared among many or all of the users. For example, WINDOWS NT™, an operating system produced and sold by Microsoft Corporation of Redmond, Wash., provides only a single copy of the code necessary to implement graphics functions, i.e. display data objects on a display screen. This approach has the drawback of not truly providing multi-user access to graphics functions because multiple user accesses would result in data collisions between individual users' data. Further, even if multiple users could simultaneously perform actions requiring invocation of the graphics code without data collisions, users would experience delays due to code contention.

SUMMARY OF THE INVENTION

The object and method described herein provide a technique that allows a portion of system address space appear to be unique for each login instance (i.e. per user or per terminal) and allows a group of processes serving a given logon instance to access the same global kernal data while keeping data associated with the logon instance separate and isolated from the data of other logon instances. The object and method described herein also allows a multi-user operating system to be implemented in a relatively small amount of memory space while avoiding the performance delays associated with code contention for single segments of code.

In brief overview, a special kernal mode memory region that instances data for each user or terminal is created. When a kernal mode module or device driver is loaded by the system, an address for that module is globally assigned in the same manner as a single instance system, i.e. a single user system. The memory management data structures are subsequently modified to provide a separate memory allocation for any portions of the module to which data can be written. A specific instance is shared among a group of processes associated with a unique logon occurrence. The module is automatically removed when the last process associated with the logon occurrence terminates.

BRIEF DESCRIPTION OF THE DRAWINGS

The invention is pointed with particularity in the appended claims. The above and further advantages of this invention may be better understood by referring to the following description taken in conjunction with the accompanying drawings, in which:

DETAILED DESCRIPTION OF THE INVENTION

Figure 1:
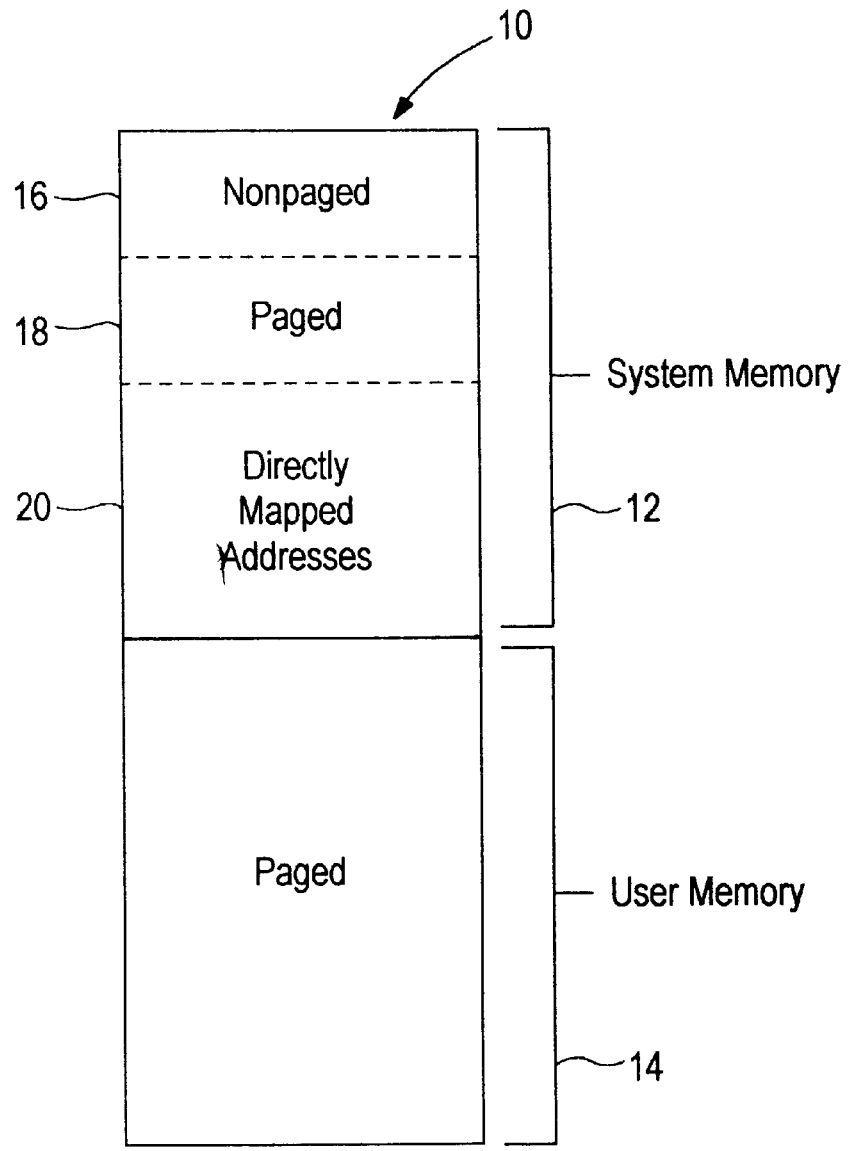
FIG. 1 is a block diagram of the virtual memory space of a WINDOWS NT™ process.

Referring now to FIG. 1, the virtual memory space 10 for a WINDOWS NT™ process is shown. In general, user-mode memory spaces 14 are assigned on a per-process basis, and virtual system memory space 12 is shared by all processes. Each virtual memory space 10 is segregated into system memory 12 (also referred to throughout the specification as kernal space) and user memory 14 (also referred to throughout the specification as user space).

User memory 14 is a set of paged memory addresses to which user and kernal threads may write. System memory 12, on the other hand, is a set of protected memory addresses. Only kernal threads may write to system memory 12. If a user thread desires to write to system memory 12, it cannot do so directly. Instead, it requests a specific system service which is system code. The operating system temporarily takes control of the user thread, giving the user thread kernal permissions. This allows the thread to write to system memory. When the thread completes its system operation, it returns to user mode. FIG. 1 shows one embodiment of a virtual memory space in which system memory 12 is further subdivided into nonpaged memory addresses 16, paged memory addresses 18, and directly mapped addresses 20.

In the embodiment shown in FIG. 1, nonpaged system memory addresses 16 are reserved for system code which is not allowed to be paged out of memory to disk, for example, the system code which handles virtual memory paging may not be paged to disk. Directly mapped addresses 20 represent a range of system addresses that are directly mapped or translated by hardware, e.g. masking off one or more bits of the address or by subtracting a predetermined constant from the virtual address to generate the physical address. Directly mapped addresses 20 are typically reserved for system code that must execute with minimum delay, for example, the system code which schedules and dispatches execution of threads.

Figure 2:
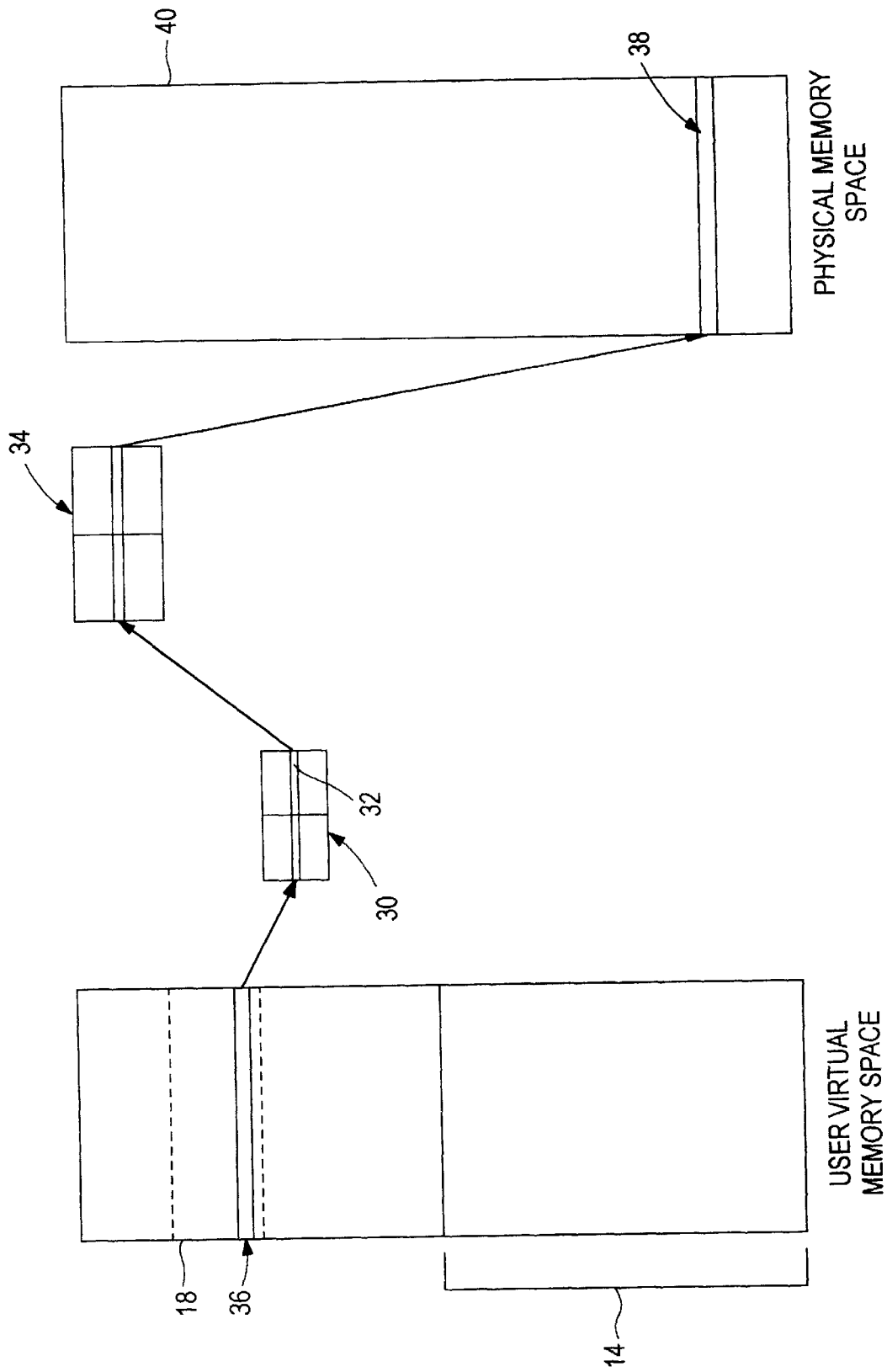
FIG. 2 is a block diagram showing the mapping between the virtual memory space and a physical memory space.

The remainder of system memory in FIG. 1 is paged system memory 18. Paged system memory 18 address ranges are used for all other aspects of system code, e.g. graphics code. Referring to FIG. 2, when a user space process requests operating system code that resides in paged system memory 18 but is not memory-resident, a page table look-up occurs. A page table look-up begins by accessing the appropriate entry, based on the address 36 requested, of the page directory 30 associated with the process. Individual page directories 30 are kept for each process and store mappings to page tables 34. Page tables 34 are kept for each user/terminal and store translations between the user's virtual memory space 10 and physical memory space 40. Accordingly, a user/terminal may have multiple page directories 30 but only one page table 34. The page table 34 may store a translation for every user page or it may store only the most recently used translations.

For example, an operating system may examine only the first n bits of an address to determine which page directory entry 32 the process should access. The page directory entry 32 is accessed and returns the address of a particular page table 34 to use. The page table 34 maps the virtual address 36, i.e. the virtual page requested by the user process, to a page 38 in physical memory 40. That is, the page table 34 stores the address of the physical page 38 in memory associated with that virtual address 36.

Although each process (i.e., each user virtual memory space 10) is provided with its own page directory 30, current operating systems typically provide only one copy of paged operating system code to service user requests. Accordingly, code contention or data collisions occur when multiple users attempt to access the same portion of operating system code at the same time.

For example, the graphics code is operating system code which implements the "desktop" with which individual users interact and allows applications to display windows and data within those windows. WINDOWS NT™ provides only one instance of kernal graphics code, which means that only a single user/desktop can be serviced at a time.

Figure 3:
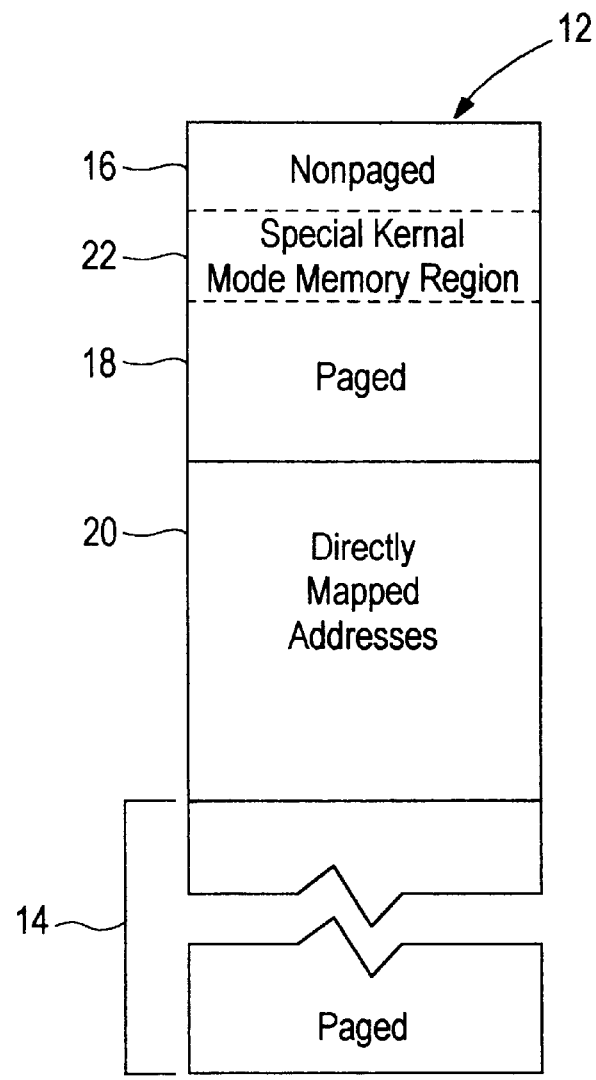
FIG. 3 is a block diagram showing the virtual memory space of a WINDOWS NT™ process having a special kernal memory mode region set aside.

Referring now to FIG. 3, code contention is alleviated in systems such as those described above by providing a special kernal mode memory region 22 which allows operating system code to be instanced for each user/terminal, that is, operating system code may be instanced on a per process, or per group of processes, basis. The special region 22 may be set aside at system start-up time, or the region 22 may be dynamically set aside based on the occurrence of a predetermined event, e.g. the system could set aside the special kernal mode memory region 22 once a second user logs onto the system. The special kernal mode memory region 22 is used for paged operating system code that may be invoked by multiple processes.

As noted above, when a user process requests shared operating system code and if the code is not memory-resident, a page table look-up must occur. The page directory provides an address into the appropriate page table which maps the special kernal mode memory region 22 to physical memory. Physical memory contains an instantiation of the requested operating system code. By appropriately manipulating the entries in the page directory table 20, groups of processes are able to share operating system code instantiations. Individual processes may have page directory entries associated with particular operating system code segments each set to the same page table 30. The page table 30 will map the special kernal mode memory region 22 associated with process to physical memory containing an instantiation of operating system code.

For example, a client node requests the operating system to draw a rectangle on the display screen associated with its terminal. The client node makes its request by, for example, making a call to a dynamically loaded library (DLL) of operating system functions. The operating system accesses the paged operating system memory address corresponding to the requested DLL module. If that module is memory-resident, no page fault occurs and the rectangle is drawn. However, if the module is not memory-resident then a page table lookup as described above will occur, the virtual page will paged into physical memory from disk, and then the rectangle will be drawn.

Figure 4:
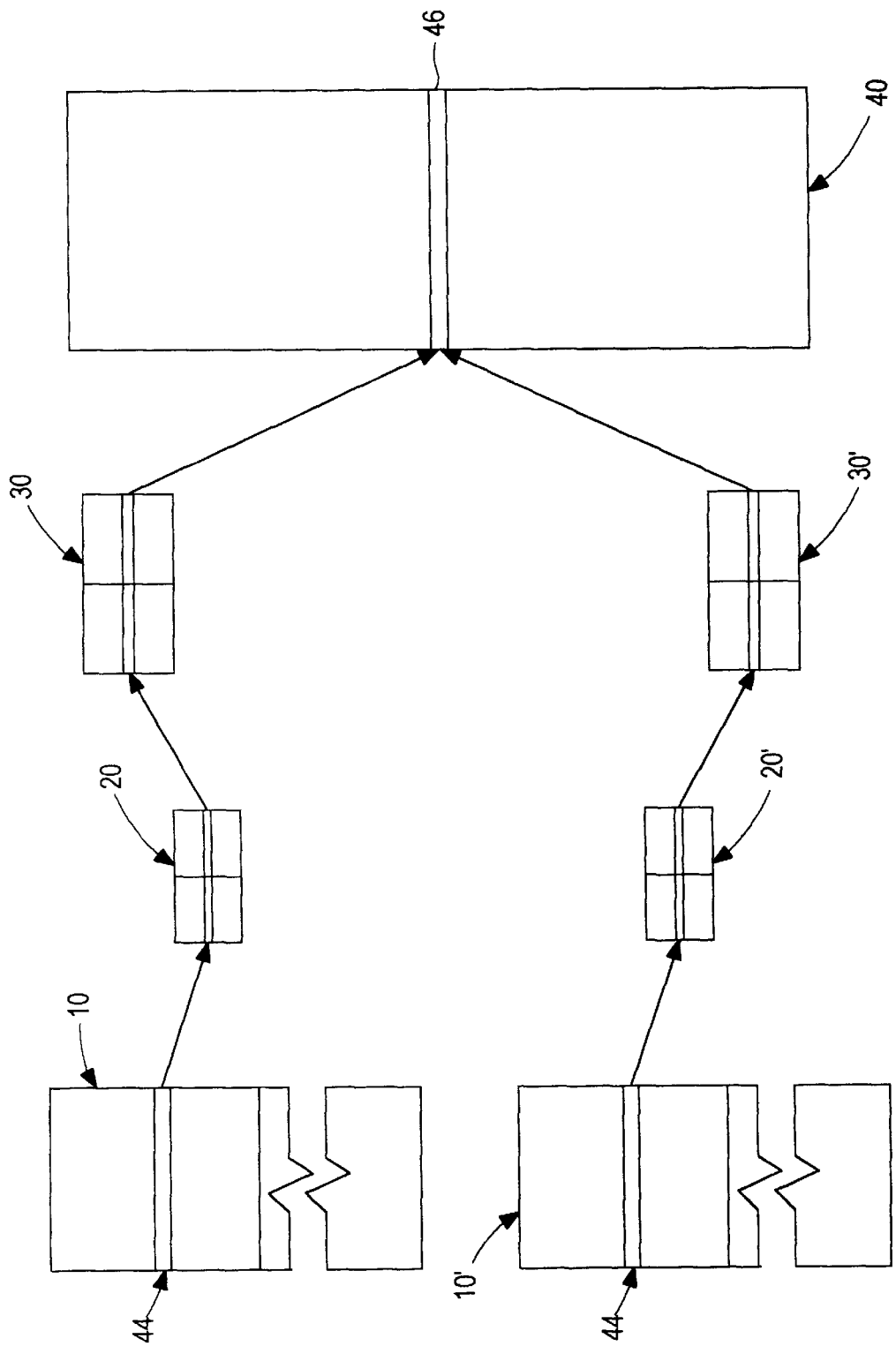
FIG. 4 is a block diagram showing two processes which map the same operating system address to the same instanced copy of the operating system code.

For example, FIG. 4 depicts two processes, which may or may not be associated with the same user/terminal, accessing the same operating system code instantiation. The virtual memory space 10, 10' of the two processes have page directories 20, 20' and page tables 30, 30'. The intermediate page directories 20, 20' and page tables 30, 30' point to the same instantiation of operating system code 46 stored in physical memory 40. Each process uses the same virtual memory address 44 to access the operating system code instantiation 46 stored in physical memory 40, and each process is able to operate on the same operating system code instantiation.

FIG. 4 depicts normal operation for the system and method so long as one of the processes does not request that a system write occur. Sharing the same operating system object instantiation between processes minimizes the physical memory which is consumed by the operating system and, since the processes are not writing to the instantiations, data collisions do not occur and code contentions are minimized. However, if a process requests that a write occur to the system object instantiation, a private instantiation must be created for that process. Any method of detecting writes to the system object instantiation can be used so long as the write is detected before it occurs.

Figure 5:
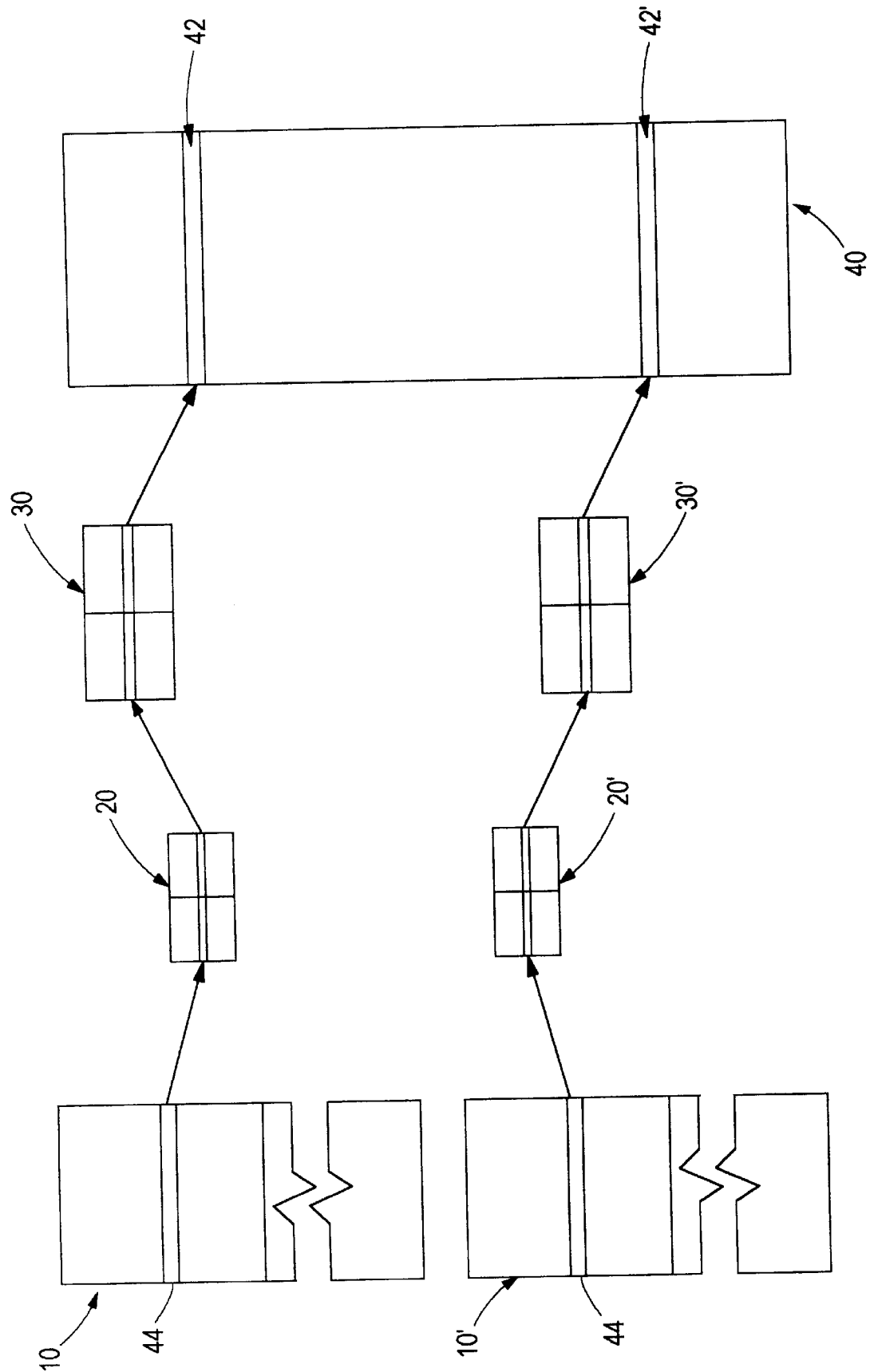
FIG. 5 is a block diagram showing two processes which map the same operating system address to separate, instanced copies of the operating system code.

FIG. 5 shows the virtual memory to physical memory mapping that exists after a process requests that a write occur to the system code. The virtual memory space 10, 10' of each process has page directories 20, 20' and page tables 30, 30' pointing to private instantiations of operating system graphics code 42, 42' stored in physical memory 40. Each process continues to access its own graphics code instantiation using the same virtual address 44, but the intermediate page directories 20, 20' and page tables 30, 30' direct those requests to different instantiations of the operating system code 42, 42' stored in physical memory 40. Once a separate instantiation of operating system code is created for a process associated with a user/terminal, all the processes associated with that user/terminal may then access the private instantiation. This allows all processes associated with a user/terminal to access the most recent system data associated with its user/terminal.

The redirection of operating system accesses described above may be achieved by providing the operating system with an additional data structure. The data structure stores information about the various operating system code instantiations present in the system. In one embodiment, the data structure includes an identification of the terminal associated with the process, a list of the processes sharing the terminal, a list of the kernal mode modules loaded in the special memory region (name and address), and which page table entries have been instanced. Whenever operating system code is accessed, the described data structure can be accessed to determine whether a new instantiation needs to be created or whether an instantiation shared by the process already exist. For example, if a process accesses graphics code and no page fault occurs, the memory access occurs normally as described above. If a page fault occurs, however, the data structure described above is first accessed to determine if the graphics code has been loaded by any other process, regardless of the user/terminal with which it is associated. If it has been loaded the page directory entries and page table entries for that virtual address are set to direct accesses to the shared instantiation in physical memory. If the process then attempts to write to operating code memory, the write is trapped, a new instantiation of the kernal object 42' is created in physical memory 40, and the page directory entries and page table entries associated with that virtual address are changed to reflect the new physical location of the private instantiation 42'. Once this change is made, all processes associated with that user/terminal will automatically access the private instantiation because only one page table per user/terminal is provided. Alternatively, instead of providing an additional, new data structure, an already existing memory management data structure present in the system may be altered to provide similar information.

The method and apparatus of the present invention may be provided as an article of manufacture having computer-readable program means embodied thereon. The article can be any form of computer-readable media, including hardware, e.g. RAM chip, ROM chip, or PROM chip, as well as traditional form of software distribution, e.g. floppy disk, hard disk, optical disk, magneto-optical disk, or CD-ROM. The computer-readable program means embodied thereon are any form of program means that provide the functions described above, whether as a single monolithic program or as functional modules. The program means may be provided as object code or they may be provided as source code written in C, C++, PASCAL, LISP, FORTRAN or some other suitable programming language.

Having described certain embodiments of the invention, it will now become apparent to one of ordinary skill in the art that other embodiments incorporating the concepts of the invention may be used. Therefore, the invention should not be limited to certain embodiments, but rather should be limited only by the spirit and scope of the following claims.

What is claimed is:

1. In a computer system servicing at least a first user and a second user and including an operating system having a kernal memory space for storing protected code, an apparatus for improving the performance of the system comprising:

a kernal mode memory region of the kernal memory space reserved for storing instantiations of kernal objects;

a first instantiation of a kernal object stored in said kernal mode memory region associated with the first user of the system; and a second instantiation of the kernal object stored in said kernal mode memory region associated with the second user of the system;

wherein each instantiation of said kernal object has the same virtual address.

2. The apparatus of claim 1 further comprising a memory-management data structure providing a separate allocation of memory for each instantiation of said kernal object.

3. The apparatus of claim 1 wherein said kernal object is a graphics subsystem.

4. The apparatus of claim 1 wherein an instantiation of said kernal object is shared by a plurality of processes, each of said plurality of processes associated with a unique login occurrence.

5. A method for providing a first user and a second user concurrent access to shared, writeable operating system kernal code, the method comprising:

(a) reserving a first region of kernal mode memory space for the first user and a second region of kernal mode memory space for the second user;

(b) creating a first instantiation of a computer kernal object associated with the first user of the computer system;

(c) creating a second instantiation of a computer kernal object associated with the second user of the computer system;

(d) storing the first kernal object instantiation in the first kernal mode memory region and the second kernal object instantiation in the second kernal mode memory region; and (e) accessing the first kernal object instantiation and the second kernal object instantiation using the same virtual address.

6. The method of claim 5 further comprising the step of:

(f) removing the first kernal object instantiation when the first user terminates use of the computer system.

7. The method of claim 5 further comprising the step of modifying memory management data structures to provide a separate memory allocation for each of the kernal object instantiations.

8. The method of claim 7 wherein an entry in a first page table is modified to map a first virtual operating system address to the first kernal object instantiation.

9. An article of manufacture having computer-readable program means embodied thereon for providing a first user and a second user concurrent access to shared, writeable operating system kernal code, the article comprising:

computer-readable program means for reserving a first region of kernal mode memory space for the first user and a second region of kernal mode memory space for the second user;

computer-readable program means for creating a first instantiation of a computer kernal object associated with the first user of the computer system;

computer-readable program means for creating a second instantiation of a computer kernal object associated with the second user of the computer system; and computer-readable program means for storing the first kernal object instantiation in the first kernal mode memory region and the second kernal object instantiation in the second kernal mode memory region and accessing the first kernal object instantiation and the second kernal object instantiation by the same virtual address.

10. The article of claim 9 further comprising computer-readable program means for removing the first kernal object instantiation when the first user terminates use of the computer system.

11. The article of claim 9 further comprising computer-readable program means for modifying memory management data structures to provide a separate memory allocation for each of the kernal object instantiations.

12. The article of claim 11 wherein an entry in a first page table is modified to map a first virtual operating system address to the first kernal object instantiation.

* * * * *